US012764268B2

(12) United States Patent
Liu et al.

(10) Patent No.: US 12,764,268 B2
(45) Date of Patent: Oct. 13, 2026

(54) THREE-DIMENSIONAL IMAGING DEVICE AND METHOD

(71) Applicant: Guangzhou Luxvisions Innovation Technology Limited, Guangzhou (CN)

(72) Inventors: Guan-Yang Liu, Guangzhou (CN); Shih-Chieh Yen, Guangzhou (CN); Yi-Wei Liu, Guangzhou (CN); Tsung-Kai Chang, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 102 days.

(21) Appl. No.: 18/764,533

(22) Filed: Jul. 5, 2024

(65) Prior Publication Data

US 2025/0203060 A1 Jun. 19, 2025

(30) Foreign Application Priority Data

Dec. 19, 2023 (CN) ........................ 202311760929.X

(51) Int. Cl.

| | |
|---|---|
| ***H04N 13/243*** | (2018.01) |
| ***G02B 27/28*** | (2006.01) |
| ***G03B 35/08*** | (2021.01) |
| ***H04N 13/00*** | (2018.01) |
| ***H04N 13/106*** | (2018.01) |

(52) U.S. Cl.

CPC ......... *H04N 13/243* (2018.05); *G02B 27/283* (2013.01); *G03B 35/08* (2013.01); *H04N 13/106* (2018.05); *H04N 2013/0081* (2013.01); *H04N 2213/001* (2013.01)

(58) Field of Classification Search

CPC ............... H04N 13/243; H04N 13/106; H04N 2213/001; H04N 2013/0081; G02B 27/283; G03B 35/08

See application file for complete search history.

(56) References Cited

U.S. PATENT DOCUMENTS 9,113,096 B1 * 8/2015 Azuma .................. H04N 23/90
2004/0201888 A1 * 10/2004 Hagita ................. H04N 13/161 359/462
2010/0283837 A1 * 11/2010 Oohchida .............. G03B 35/08 348/47
2012/0307018 A1 * 12/2012 Damstra .............. H04N 13/207 348/E13.074

(Continued)

*Primary Examiner* — Rowina J Cattungal
(74) *Attorney, Agent, or Firm* — Hodgson Russ LLP

(57) ABSTRACT

A three-dimensional imaging device includes a lens group configured for gathering light beams to output a first light beam and a second light beam towards a first direction; a beam-splitting prism group provided on a side of the lens group that outputs the light beams for transmitting and reflecting a first light beam and a second light beam; a polarizer group including at least three polarizers provided on a side of the beam-splitting prism group that outputs a light beam; the polarizer group is configured for converting the transmitted light beam or the reflected light beam into a polarized light of a preset polarization angle; and a sensor group including at least three sensors, a position of each sensor corresponds to a position of each polarizer, each sensor is configured to obtain the polarized light of the preset polarization angle output from each polarizer to form an image.

9 Claims, 7 Drawing Sheets

(56) References Cited

U.S. PATENT DOCUMENTS

| | | | | |
|---|---|---|---|---|
| 2012/0320164 | A1* | 12/2012 | Lipton | H04N 13/218 348/E13.074 |
| 2015/0172631 | A1* | 6/2015 | Kasahara | H04N 13/271 348/46 |
| 2015/0177531 | A1* | 6/2015 | Ouderkirk | B32B 37/18 156/247 |

* cited by examiner

THREE-DIMENSIONAL IMAGING DEVICE AND METHOD

CROSS-REFERENCE TO RELATED APPLICATIONS

This application claims priority to Chinese Patent Application 202311760929.X, filed on Dec. 19, 2023, the entire disclosure of which is incorporated herein by reference.

TECHNICAL FIELD

The present application belongs to the field of three-dimensional imaging technology, and particularly to a three-dimensional imaging device and method.

BACKGROUND

With the development of camera imaging technology, people are no longer limited to imaging in two-dimensional plane, a three-dimensional stereo imaging technology is thus gradually developed. In the current three-dimensional stereoscopic imaging technology, the active imaging technology is difficult to reconstruct transparent and smooth (highly reflective) surface of the objects, and is susceptible to interference by changes in the external environment and light source.

It is to be noted that the information disclosed in the above background technology section is only intended to enhance the understanding of the background of the present application, and thus may include information that does not constitute related art known to those skilled in the art.

SUMMARY

There are three-dimensional imaging devices and methods for solving the technical problem of low accuracy in reconstructing the surface of an object in the related technology. The technical solution is as below:

According to an aspect of the embodiment of the present application, it provides a three-dimensional imaging device, which includes:

a lens group, gathering light beams to output a first light beam and a second light beam towards a first direction;

a beam-splitting prism group including a first beam-splitting prism and a second beam-splitting prism provided on a side of the lens group outputs the light beams, wherein the first beam-splitting prism transmits and reflects the first light beam to output a first transmitted light beam towards the first direction and a first reflected light beam towards a second direction; wherein the second beam-splitting prism transmits and reflects the second light beam to output a second transmitted light beam towards the first direction and a second reflected light beam towards the second direction; wherein the first direction and the second direction have a preset angle;

a polarizer group including at least three polarizers, wherein the at least three polarizers are provided on a side of the beam-splitting prism group outputs a light beam, wherein at least one of the polarizers is provided on a side of the beam-splitting prism group outputs a transmitted light beam, and at least one of the polarizers is provided on a side of the beam-splitting prism group outputs a reflected light beam; wherein the transmitted light beam comprises the first transmitted light beam and the second transmitted light beam, wherein the reflected light beam includes the first reflected light beam and the second reflected light beam; wherein the polarizer group converts the transmitted light beam or the reflected light beam into a polarized light of a preset polarization angle; and a sensor group comprising at least three sensors, wherein a position of each sensor corresponds to a position of each polarizer, wherein each sensor obtains the polarized light of the preset polarization angle output from each polarizer to form an image.

According to an aspect of the present application, it provides a three-dimensional imaging method, which includes:

obtaining pictures formed by at least three polarization angles of a to-be-measured object, wherein the pictures are generated by a three-dimensional imaging device;

analyzing the pictures of different polarization angles to determine an azimuth angle and a zenith angle of a normal of each pixel point in the pictures, wherein the azimuth angle is an angle between the normal of each pixel point and a horizontal direction, and the zenith angle is an angle between the normal of each pixel point and a vertical direction;

forming a normal vector gradient field of each pixel point based on the azimuth angle and the zenith angle of the normal of each pixel point;

integrating the normal vector gradient field of each pixel point to obtain depth information of each pixel point; and generating a three-dimensional image of the to-be-measured object based on the depth information of each pixel point.

It should be understood in the present application that the above general description and the later detailed description are only exemplary and explanatory, and do not limit the present application.

BRIEF DESCRIPTION OF THE DRAWINGS

The accompanying drawings herein are incorporated into and form a part of the specification, illustrate embodiments in accordance with the present application, and are used in conjunction with the specification to explain the principles of the present application. It will be apparent that the accompanying drawings in the following description are only some of the embodiments of the present application, and that other drawings may be obtained from these drawings by those skilled in the art without creative labor.

DETAILED DESCRIPTION OF THE EMBODIMENTS

Embodiments will now be described more fully with reference to the accompanying drawings. However, the embodiments can be implemented in a variety of forms and should not be construed as limitation to the examples set forth herein; rather, the provision of these embodiments allows the present application to be more comprehensive and complete, and conveys the idea of the embodiments in a comprehensive manner to those skilled in the art.

Figure 1:
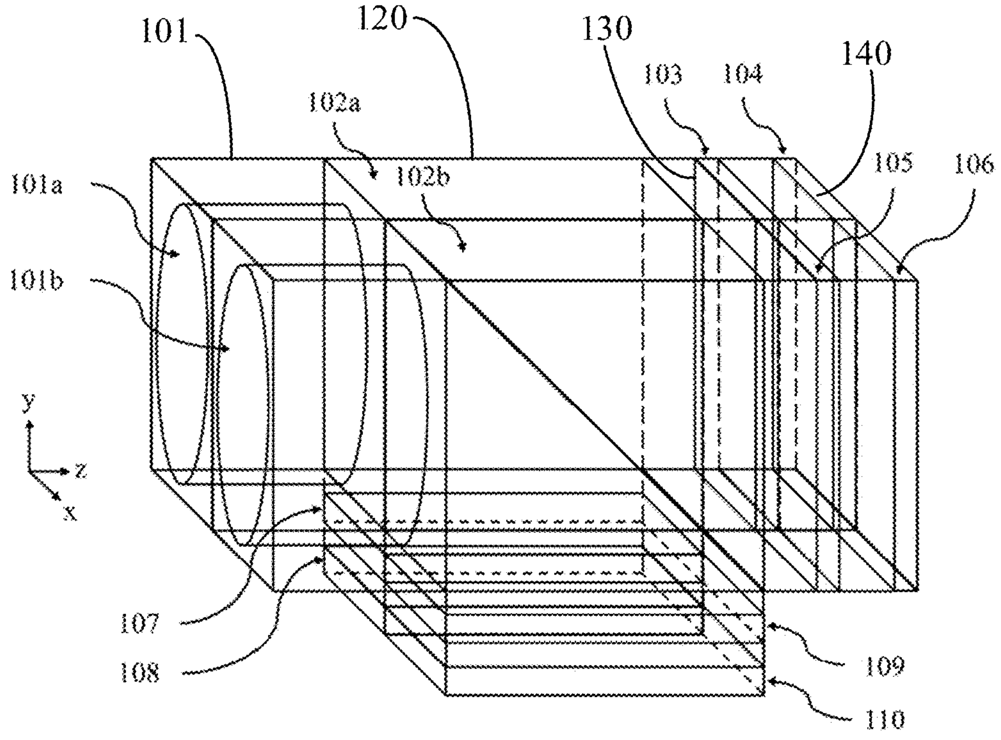
FIG. 1 is a schematic structural view of a three-dimensional imaging device according to an embodiment of the present application.

The following describes an embodiment of a three-dimensional imaging device of the present application, as shown in FIG. 1, a three-dimensional imaging device provided by the present application includes a lens group 101, a beam-splitting prism group 120, a polarizer group 130, and a sensor group 140.

The lens group 101 includes a first lens 101*a* and a second lens 101*b*. The lens group 101 is used to gather light beams to output a first light beam and a second light beam towards a first direction. In FIG. 1, a positive direction of the z-axis is the first direction, and the light beams gathered with the lens group 101 can be output from the first direction, so that the first light beams and the second light beams with information about the surface of the object continue to be incident into the beam-splitting prism group 120, and the ability of the fringe light beams to be incident into the three-dimensional imaging device can be improved. When light is irradiated from the air to the surface of the object, some of the light will be reflected from the surface of the object back into the air, and the light beams reflected from the surface of the object contain information about the surface of the object, and the surface of the object can be reconstructed in three dimensions by analyzing and processing the light beams captured by the lens group 101.

Figure 2:
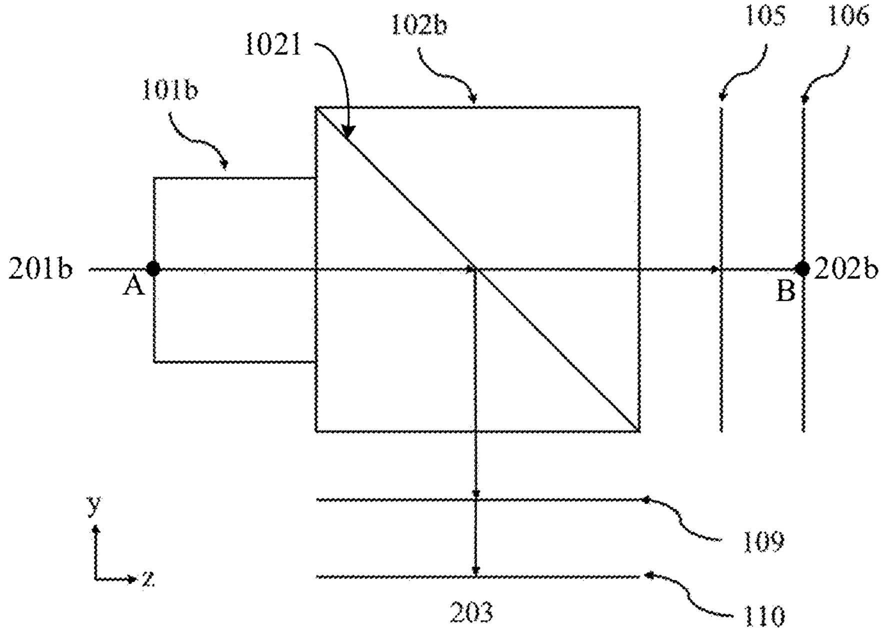
FIG. 2 is a schematic structural view of the three-dimensional imaging device according to an embodiment of the present application.

The beam-splitting prism group 120 is provided on a side of the lens group 101 that outputs light beams. The beam-splitting prism group 120 includes a first beam-splitting prism 102*a* and a second beam-splitting prism 102*b*. As shown in FIG. 1, the first beam-splitting prism 102*a* is configured for transmitting and reflecting the first light beam, so as to output the first transmitted light beam toward the first direction and the first reflected light beam toward a second direction, thereby dividing the first light beam into the first transmitted light beam and the first reflected light beam. This is because when reconstructing the surface of the object, it is necessary to calculate the direction of the normal of a pixel point based on the polarized light of at least three different polarization angles. As shown in FIG. 2, the second beam-splitting prism 102*b* is configured for transmitting and reflecting the second light beam to output the second transmitted light beam toward the first direction and the second reflected light beam toward the second direction, thereby dividing the second light beam into the second transmitted light beam and the second reflected light beam. Further, the first direction and the second direction have a preset angle, i.e., the angle between the first transmitted light beam and the first reflected light beam is equal to the preset angle, and the angle between the second transmitted light beam and the second reflected light beam is equal to the preset angle. It should be understood that in FIG. 2, a negative direction of the y-axis indicating the second direction is only one of the embodiments of the present application, and the preset angle may be equal to 90°, or may be equal to any angle other than 0° and 180°.

The polarizer group 130 includes at least three polarizers provided on a side of the beam-splitting prism group 120 that outputs a light beam. At least one of the polarizers is provided on a side of the beam-splitting prism group 120 that outputs a transmitted light beam, and at least one of the polarizers is provided on a side of the beam-splitting prism group 120 that outputs a reflected light beam. The transmitted light beam includes a first transmitted light beam and a second transmitted light beam, and the reflected light beam includes a first reflected light beam and a second reflected light beam. The polarizer group 130 is used to convert the transmitted light beam or the reflected light beam into a polarized light of a preset polarization angle.

Specifically, an asymmetry of the vibration direction relative to the propagation direction is called polarization, and then the polarized light is light whose vibration direction is asymmetric relative to the propagation direction. A polarizer is an optical basic element that can transform the incident light in any polarization state into the polarized light. The preset polarization angle may be any three polarization angles among 0°, 45°, 90° and 135°, or the polarizers may be provided with the above four polarization angles, for example, the first polarizer 103 has a polarization angle of 0°, the second polarizer 105 has a polarization angle of 45°, the third polarizer 107 has a polarization angle of 90°, and the fourth polarizer 109 has a polarization angle of 135°. It should be understood that the preset polarization angles are not limited to the angles enumerated herein. Since the direction of the normal of the pixel point needs to be calculated on the basis of the polarized light of at least three different polarization angles when reconstructing the surface of the object, the transmitted light beam or the reflected light beam is converted into the polarized light of the preset polarization angles by the polarizer group 130. In addition, the polarized light of at most two polarization angles is obtained in the first direction or the second direction, therefore, at least one polarizer is provided on a side of the beam-splitting prism group 120 that outputs the transmitted light beam, and at least one polarizer is provided on a side of the beam-splitting prism group 120 that outputs the reflected light beam.

The sensor group 140 includes at least three sensors. A position of each sensor corresponds to that of each polarizer. Each sensor is configured to obtain the polarized light with the preset polarization angle output from each polarizer to form an image.

Specifically, the sensor is used to obtain the light intensities of the polarized lights of different preset polarization angles to provide data in a subsequent image reconstruction process. As shown in FIG. 1, the sensor group 140 may include a first sensor 104, a second sensor 106, a third sensor 108, and a fourth sensor 110. As shown in FIG. 2, a position of the sensor corresponding to a position of the polarizer means that, along a positive direction of the z-axis, the second sensor 106 is provided at a rear of the second polarizer 105, and that a center of the second sensor 106 and a center of the second polarizer 105 are both located in the same straight line, and that along a negative direction of the y-axis, the fourth sensor 110 is provided below the fourth polarizer 109, and the center of the fourth sensor 110 and the center of the fourth polarizer 109 are both located in the same straight line. In conjunction with FIGS. 2 and 3, when the sensor group includes three sensors, the sensor group 140 includes a first sensor 104, a second sensor 106, and a fourth sensor 110, the first sensor 104 receives polarized light that passes through the first polarizer 103, the second sensor 106 receives polarized light that passes through the second polarizer 105, and the fourth sensor 110 receives polarized light that passes through the fourth polarizer 109. It should be understood that the manner in which the sensors are provided is not limited to that shown in FIGS. 2 and 3 and will not be repeated herein.

In the technical solution of the present application, the light beam reflected from the surface of the object is gathered by the lens group to obtain the first light beam and the second light beam. The beam-splitting prism group can transmit and reflect the first light beam and the second light beam respectively, so as to obtain the first transmitted light beam, the first reflected light beam, the second transmitted light beam, and the second reflected light beam, and then the transmitted and reflected light beams are converted by the polarizer group into the polarized lights with the preset polarization angles, and finally at least three polarized lights with different preset polarization angles are obtained by the sensor group to form an image. With the three-dimensional imaging device provided by the present application, the number of lenses can be reduced and the structure of the three-dimensional imaging device can be optimized, and the present application belongs to the passive imaging technology, which is capable of reconstructing the surface of an object even when the surface of the object is transparent and highly reflective, so as to improve the accuracy of the three-dimensional imaging.

In one embodiment of the present application, as shown in FIG. 2, any one of the beam-splitting prisms in the beam-splitting prism group 120 includes a beam-splitting surface 1021, and an angle between the beam-splitting surface 1021 and the first light beam and an angle between the beam-splitting surface 1021 and the second light beam both are not equal to 90° and 180°, and the beam-splitting surface 1021 is configured for transmitting a first preset proportion of light and reflecting a second preset proportion of light in the first light beam, or for transmitting the first preset proportion of light and reflecting the second preset proportion of light in the second light beam.

Specifically, the beam-splitting surface 1021 is neither perpendicular nor parallel to the first light beam and the second light beam, otherwise a first transmitted light beam in the first direction and a first reflected light beam in the second direction cannot be obtained after the first light beam passes through the beam-splitting prism group, and a second transmitted light beam in the first direction and a second reflected light beam in the second direction cannot be obtained after the second light beam passes through the beam-splitting prism group. The specific proportions of the first preset proportion and the second preset proportion depend on factors such as the angles between the beam-splitting surface 1021 and the first light beam and the second light beam, and the material of the beam-splitting surface 1021 or process. For example, a ratio of the first preset proportion to the second preset proportion may be 50%: 50%, 30%: 70%, or 20%: 80%, and if the ratio of the first preset proportion to the second preset proportion is 30%: 70%, then 30% of the first light beam is transmitted by the beam-splitting surface 1021, and 70% of the first light beam is reflected by the beam-splitting surface 1021; and 30% of the second light beam is transmitted by the beam-splitting surface 1021, and 70% of the second light beam is reflected by the beam-splitting surface 1021.

In one embodiment of the present application, the beam-splitting surface 1021 is coated with a multi-layers dielectric film by evaporation coating, such that the beam-splitting surface 1021 is transmissible and reflective of the first light beam and the second light beam.

Specifically, the beam-splitting surface 1021 is coated with the multi-layers dielectric film by evaporation coating, which means that the material is evaporated and condensed into a film on the beam-splitting surface 1021 under vacuum conditions, and then after high-temperature heat treatment, a film layer with strong adhesion is formed on the beam-splitting surface 1021. The dielectric film layer is a film layer of an insulating nature, and different dielectric film layers, when combined based on certain optical thicknesses, can form an optical film, for example, the combination of $Ta_2O_5$ and $SiO_2$ can play a role in increasing the transmittance (decreasing the reflectivity) or high reflectivity for the emergent light at a certain wavelength. Therefore, the multi-layers dielectric film is coated on the beam-splitting surface 1021, which can enable the beam-splitting surface 1021 to transmit and reflect the first light beam and the second light beam. The combination of different dielectric film layers, the first preset proportion and the second preset proportion of the beam-splitting surface 1021 can be adjusted.

Figure 3:
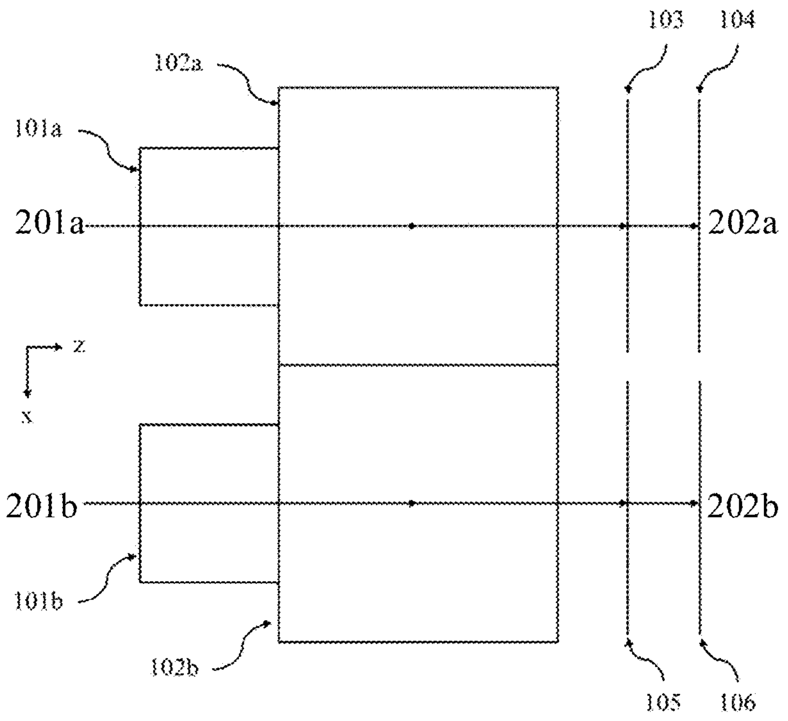
FIG. 3 is a schematic structural view of the three-dimensional imaging device according to an embodiment of the present application.
Figure 4:
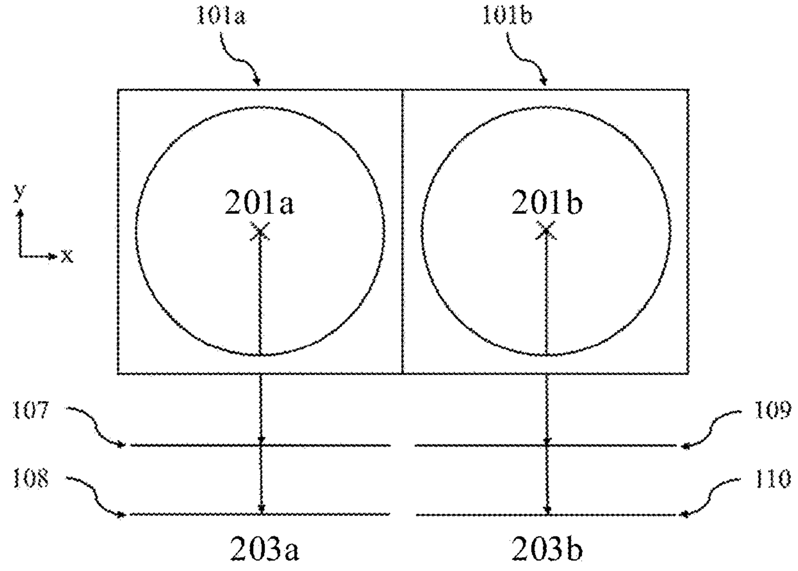
FIG. 4 is a schematic structural view of the three-dimensional imaging device according to an embodiment of the present application.

In one embodiment of the present application, as shown in FIGS. 3 and 4, the lens group includes a first lens 101*a* and a second lens 101*b*; the polarizer group includes a first polarizer 103, a second polarizer 105, and a third polarizer 107; and the sensor group includes a first sensor 104, a second sensor 106, and a third sensor 108; and along the first direction, centers of the first lens 101*a*, the first beam-splitting prism 102*a*, the first polarizer 103 and the first sensor 104 are located in the same axis, and centers of the second lens 101*b*, the second beam-splitting prism 102*b*, the second polarizer 105 and the second sensor 106 are located in the same axis; along the second direction, centers of the first beam-splitting prism 102*a*, the third polarizer 107 and the third sensor 108 are located in the same axis. Alternatively, the polarizer group includes a first polarizer 103, a second polarizer 105 and a third polarizer 107; the sensor group includes a first sensor 104, a second sensor 106 and a third sensor 108; along the first direction, centers of the first lens 101*a*, the first beam-splitting prism 102*a*, the first polarizer 103 and the first sensor 104 are located in the same axis, and centers of the second lens 101*b*, the second beam-splitting prism 102*b*, the second polarizer 105 and the second sensor 106 are located in the same axis; and along the second direction, centers of the second beam-splitting prism 102*b*, the third polarizer 107 and the third sensor 108 are located in the same axis.

Specifically, this embodiment is a case where the polarizer group has two polarizers in the first direction and only one polarizer in the second direction, and accordingly, the polarizer group also has two sensors in the first direction and only one sensor in the second direction. As shown in FIGS. 3 and 4, the light beam 201*a* in the first direction (i.e., the positive direction of the z-axis) enters into the three-dimensional imaging device of the present application from the first lens 101*a*, and passes through the first beam-splitting prism 102*a*, the first polarizer 103 in turn, and finally the polarized light 202*a* is obtained by the first sensor 104. The light beam 201*b* in the first direction (i.e., the positive direction of the z-axis) enters into the three-dimensional imaging device of the present application from the second lens 101*b*, and passes through the second beam-splitting prism 102*b*, the second polarizer 105 in turn, and finally the polarized light 202*b* is obtained by the second sensor 106. The light beam 201*a* in the first direction (i.e., the positive direction of the z-axis) enters into the three-dimensional imaging device of the present application from the first lens 101*a*, and passes through the first beam-splitting prism 102*a*, and is reflected to the second direction (i.e., the negative direction of the y-axis), and passes through the third polarizer 107, and finally the polarized light 203*a* is obtained by the third sensor 108. It should be understood that the above scenarios are only some of the specific scenarios of the beam path of the present embodiment, and other scenarios will not be elaborated herein. In addition, the light beam 201*a* and the light beam 201*b* are only used to differentiate the lenses into which the incident light beam enters, and it doesn't mean that the light beam 201*a* and the light beam 201*b* are two different light beams.

In one embodiment of the present application, the lens group includes a first lens 101*a* and a second lens 101*b*; the polarizer group includes a first polarizer 103, a second polarizer 105, and a third polarizer 107; the sensor group includes a first sensor 104, a second sensor 106, and a third sensor 108; and along the first direction, centers of the first lens 101*a*, the first beam-splitting prism 102*a*, the first polarizer 103 and the first sensor 104 are located in the same axis; along the second direction, centers of the first beam-splitting prism 102*a*, the second polarizer 105 and the second sensor 106 are located in the same axis, and centers of the second beam-splitting prism 102*b*, the third polarizer 107 and the third sensor 108 are located in the same axis. Alternatively, the polarizer group includes a first polarizer 103, a second polarizer 105 and a third polarizer 107; the sensor group includes a first sensor 104, a second sensor 106 and a third sensor 108; along the first direction, centers of the second lens 101*b*, the second beam-splitting prism 102*b*, the first polarizer 103 and the first sensor 104 are located in the same axis; along the second direction, centers of the first beam-splitting prism 102*a*, the second polarizer 105 and the second sensor 106 are located in the same axis, and centers of the second beam-splitting prism 102*b*, the third polarizer 107 and the third sensor 108 are located in the same axis.

Figure 5:
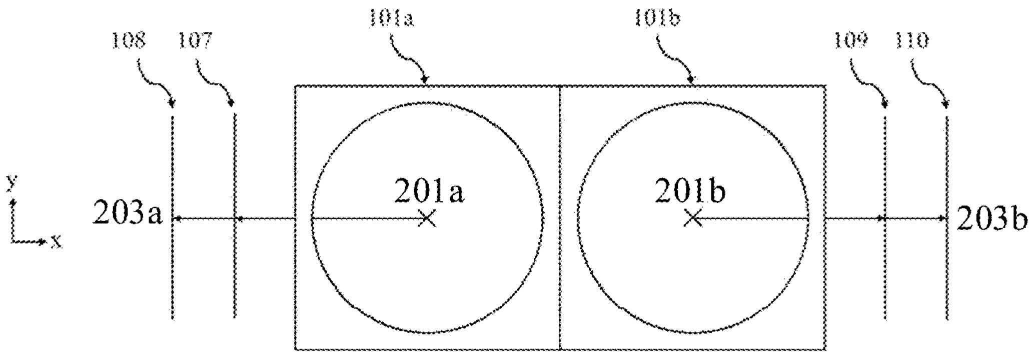
FIG. 5 is a schematic structural view of the three-dimensional imaging device according to an embodiment of the present application.

Specifically, this embodiment is a case where the polarizer group has only one polarizer in the first direction and two polarizers in the second direction, and accordingly, the sensor group also has only one sensor in the first direction and two sensors in the second direction. As shown in FIGS. 3 and 5, the light beam 201*a* in the first direction (i.e., the positive direction of the z-axis) enters into the three-dimensional imaging device of the present application from the first lens 101*a*, and passes through the first beam-splitting prism 102*a*, the first polarizer 103 in turn, and finally the polarized light 203*a* is obtained by the first sensor 104. The light beam 201*a* in the first direction (i.e., the positive direction of the z-axis) enters into the three-dimensional imaging device of the present application from the first lens 101*a*, and passes through the first beam-splitting prism 102*a*, and is reflected to the second direction (i.e., the negative direction of the x-axis), and passes through the second polarizer 105, and finally the polarized light 203*a* is obtained by the second sensor 106. The light beam 201*b* in the first direction (i.e., the positive direction of the z-axis) enters the three-dimensional imaging device of the present application from the second lens 101*b*, and passes through the second beam-splitting prism 102*b*, and is reflected to the second direction (i.e., the positive direction of the x-axis), and passes through the third polarizer 107, and finally the polarized light 203*b* is obtained by the third sensor 108. It should be understood that the above scenarios are only some of the specific cases of the beam path of the present embodiment, and other scenarios will not be further described herein.

Figure 6:
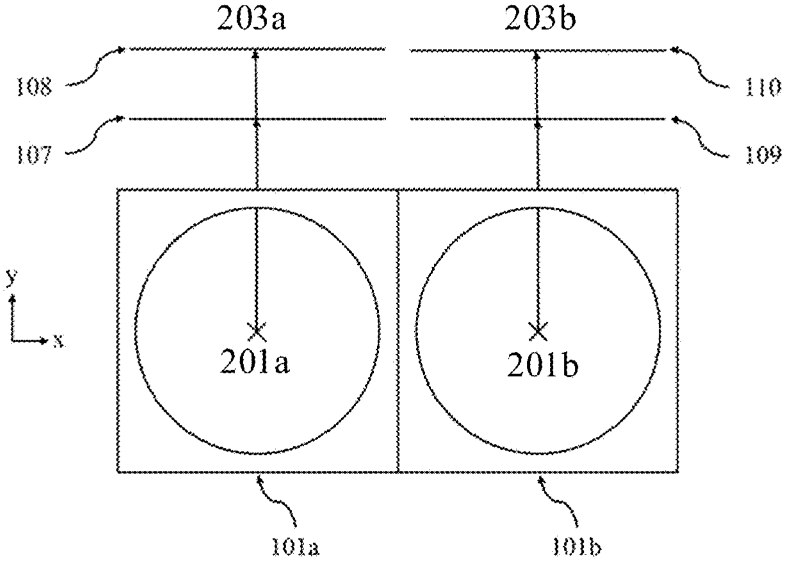
FIG. 6 is a schematic structural view of the three-dimensional imaging device according to an embodiment of the present application.

In another embodiment, the direction in which the first light beam and the second light beam are reflected by the beam-splitting prism group can be adjusted by adjusting the specific position of the beam-splitting surface 1021, i.e., the first light beam and the second light beam can be reflected by the beam-splitting prism group to the negative direction of y-axis shown in FIG. 4, to the positive direction of x-axis shown in FIG. 5, or to the positive direction of y-axis shown in FIG. 6. It should be understood that the present application does not specifically limit the direction of the reflected light beam after the light beam is reflected by the first beam-splitting prism 102*a* and the second beam-splitting prism 102*b*.

In one embodiment of the present application, as shown in FIGS. 2 to 6, beam paths formed by different beams have equal lengths, and each beam path is from a position of entering any of lenses in the lens group to a position of a sensor corresponding to the lens in the sensor group. By way of example, the beam path is from a point A at which the beam 201*a* enters the first lens 101*a*, to a point B of the first sensor 104.

In one embodiment of the present application, the polarizer group in the three-dimensional imaging device of the present application includes four polarizers, and light intensities of the polarized lights output from each of the four polarizers includes a first polarized light intensity $I_1$, a second polarized light intensity $I_2$, a third polarized light intensity $I_3$, and a fourth polarized light intensity $I_4$; the first polarized light intensity $I_1$ is a light intensity of the first polarized light obtained by the first sensor 104 and the second polarized light intensity $I_2$ is a light intensity of the second polarized light obtained by the second sensor 106; and the third polarized light intensity $I_3$ is a light intensity of the third polarized light obtained by the third sensor 108 and the fourth polarized light intensity $I_4$ is a light intensity of the fourth polarized light obtained by the fourth sensor 110; an incident light intensity $S_0$ of the device is half of a total light intensity of the polarized lights of a plurality of preset polarization angles, and the total light intensity of the polarized lights is a sum of the first polarized light intensity $I_1$, the second polarized light intensity $I_2$, the third polarized light intensity $I_3$ and the fourth polarized light intensity $I_4$; and a light intensity difference $S_1$ of the device in a first incident light polarization direction is a difference $(I_1-I_3)$ between the first polarized light intensity $I_1$ and the third polarized light intensity $I_3$; a light intensity difference $S_2$ of the device in a second incident light polarization direction is a difference ($I_2$–$I_4$) between the second polarized light intensity $I_2$ and the fourth polarized light intensity $I_4$.

Specifically, the circular polarization does not exist in the present application, and thus the polarization state of the polarized light at each of the preset polarization angles in the present device can be described by a Stokes vector ($S_0$, $S_1$, $S_2$). Stokes vectors are a set of covariates describing the polarization state of an electromagnetic wave. After the light intensities of the polarized lights of different preset polarization angles are obtained by the sensor group, relationships between the polarized lights of different preset polarization angles are expressed by the Stokes vectors, so as to reconstruct the surface of the object. For example, the first polarized light is the polarized light corresponding to the 0° polarizer, the second polarized light is the polarized light corresponding to the 45° polarizer, the third polarized light is the polarized light corresponding to the 90° polarizer, and the fourth polarized light is the polarized light corresponding to the 135° polarizer. Then the incident light intensity is $S_0=(I(0°)+I(45°)+I(90°)+I(135°))/2$. In this device, the light intensity difference of the first incident light in polarization directions is $S_1=I(0°)-I(90\%)$, the light intensity difference of the second incident light in polarization directions is $S_2=I(45°)-I(135°)$.

Figure 7:
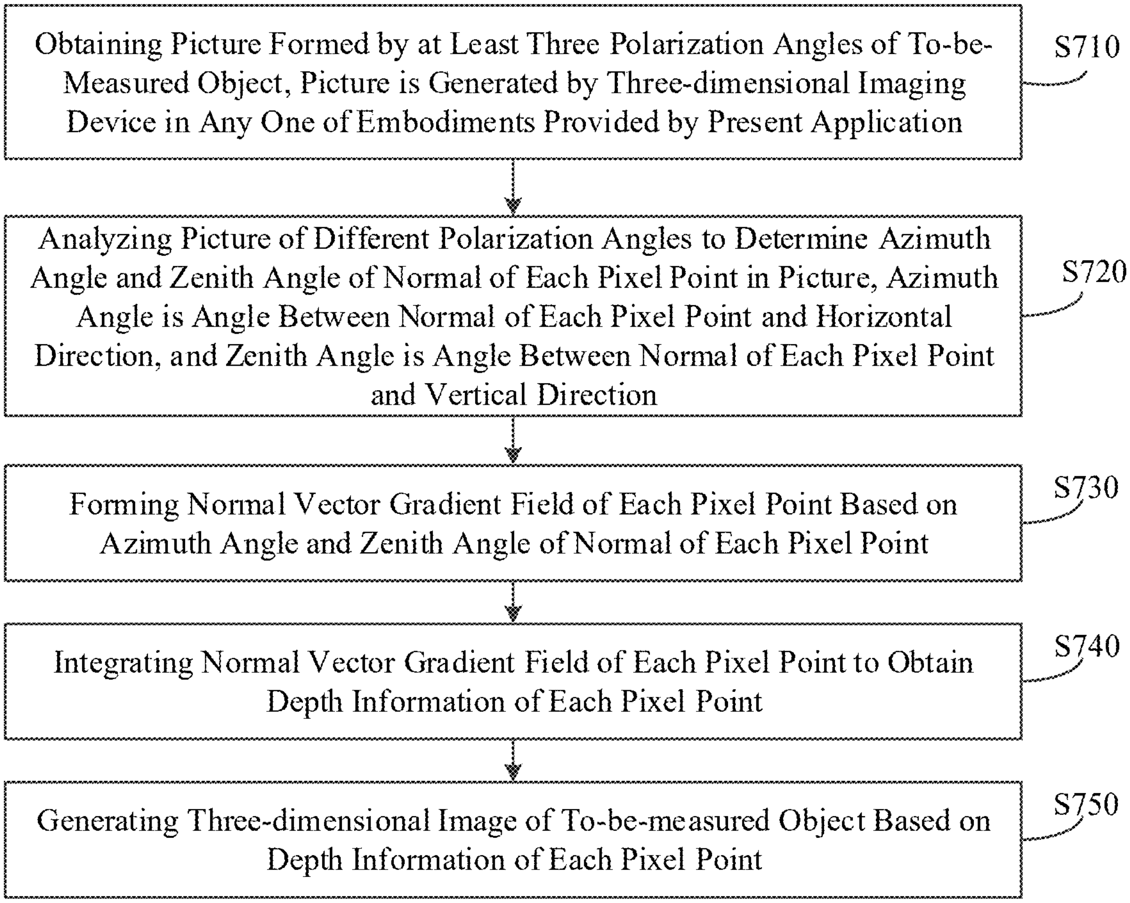
FIG. 7 is a flowchart of the three-dimensional imaging method according to an embodiment of the present application.

The following describes an embodiment of the three-dimensional imaging method of the present application, which can be applied to the three-dimensional imaging device in the above embodiment of the present application. As shown in FIG. 7, the present application provides the three-dimensional imaging method, which includes S710 to S750 as follows:

S710, obtaining pictures formed by at least three polarization angles of a to-be-measured object, the pictures are generated by the three-dimensional imaging device in any one of the embodiments provided by the present application.

Specifically, the three-dimensional imaging device of the present application can generate the pictures of the to-be-measured object corresponding to different preset polarization angles in the polarizer group, and then obtain the pictures and carry out subsequent steps to reconstruct a three-dimensional surface of the to-be-measured object.

S720, analyzing the pictures of different polarization angles to determine an azimuth angle and a zenith angle of a normal of each pixel point in the pictures, the azimuth angle is an angle between the normal of each pixel point and a horizontal direction, and the zenith angle is an angle between the normal of each pixel point and a vertical direction.

Figure 8:
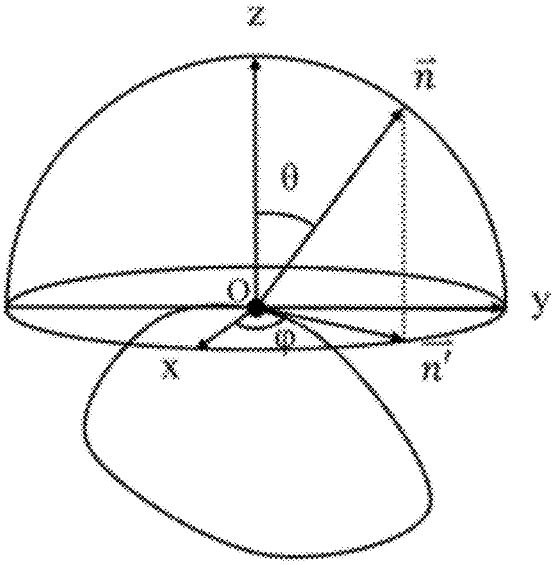
FIG. 8 is a schematic diagram of a three-dimensional coordinate system constructed with a pixel point on the to-be-measured object as an origin in the present application.

Specifically, as shown in FIG. 8, the point O is a pixel point in the pictures, the vector $\vec{n}$ represents a normal of the pixel point O. A three-dimensional coordinate system is constructed with the point O as the origin, and a projection vector $\vec{n}$ is obtained by projecting the vector $\vec{n}$ onto a planar coordinate system composed of the x-axis and the y-axis, and the angle between the projection vector $\vec{n}$ and the x-axis is the azimuth angle φ. The azimuth angle of the pixel point O can be calculated according to equation (1):

$$I(\phi_{pol}) = \frac{I_{max}+I_{min}}{2} - \frac{I_{max}-I_{min}}{2}\cos(2(\phi_{pol}-\phi)) \tag{1}$$

where $I(\phi_{pol})$ denotes the light intensity at the preset polarization angle, Imax denotes the maximum light intensity among the polarized light intensities obtained each time, $I_{min}$ denotes the minimum light intensity among the polarized light intensities obtained each time, and $\varphi_{pol}$ denotes one of the preset polarization angles, all the above parameters are known for the pixel point O, and therefore the azimuth angle φ can be obtained by solving.

Figure 9:
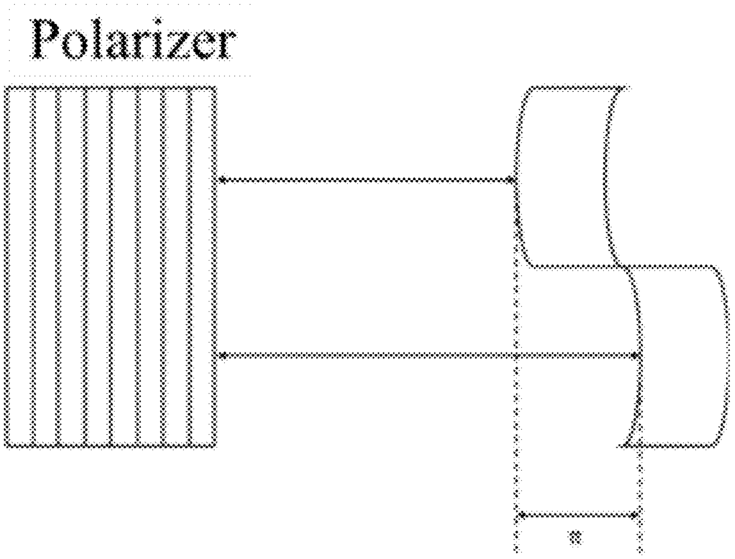
FIG. 9 is a schematic diagram of curves corresponding to two solutions of an azimuth angle in the present application.

However, when calculating the azimuth angle φ, there will exist two solutions differing by π, and one of the solutions indicates that the reflected light on the pixel point O is dominated by diffuse reflection, and the other solution indicates that the reflected light on the pixel point O is dominated by mirror reflection. As shown in FIG. 9, the concavity and convexity of the surfaces formed by the two solutions differing by π are not the same, for example, the surface formed by the first solution is convex to the inside of the paper, whereas the surface formed by the other solution differing by π from the first solution is convex to the outside of the paper, that is, the phase of the azimuth angle is related to the concavity and convexity of the to-be-measured object. Therefore, for the two calculated solutions, specific verification is required and subsequent calculations are performed based on the verified correct azimuth angle.

As shown in FIG. 8, the angle between the vector $\vec{n}$ and the z-axis is the zenith angle θ, and different azimuth angles φ correspond to different formulas for calculating the zenith angle θ, the zenith angle θ is calculated according to Eq. 2 when diffuse reflection is dominant; and the zenith angle θ is calculated according to Eq. 3 when mirror reflection is dominant.

$$\rho_d = \frac{\left(f-\frac{1}{f}\right)^2\sin^2\theta}{2+2f^2-\left(f+\frac{1}{f}\right)^2\sin^2\theta+4\cos\theta\sqrt{f^2-\sin^2\theta}} \tag{2}$$

$$\rho_s = \frac{2\sin^2\theta\cos\theta\sqrt{f^2-\sin^2\theta}}{f^2-\sin^2\theta-f^2\sin^2\theta+2\sin^4\theta} \tag{3}$$

$\rho_d$ and $\rho_s$ both denote the polarization degree, and $$\rho_d = \rho_s = \frac{\sqrt{S_1^2+S_2^2}}{S_0},$$

$S_0$ is half of a total light intensity of the polarized lights of a plurality of preset polarization angles, and the total light intensity $S_0$ of the polarized light is a sum of the first polarized light intensity $I_1$, the second polarized light intensity $I_2$, the third polarized light intensity $I_3$ and the fourth polarized light intensity $I_4$; and a light intensity difference $S_1$ of the first incident light in polarization directions is a difference ($I_1$–$I_3$) between the first polarized light intensity $I_1$ and the third polarized light intensity $I_3$; a light intensity difference $S_2$ of the second incident light in polarization directions is a difference ($I_2$–$I_4$) between the second polarized light intensity $I_2$ and the fourth polarized light intensity $I_4$, and the above parameters can be obtained from the three-dimensional imaging device of the present application; f denotes the refractive index of the material, i.e., the refractive index of the material of the lens group and the beam-splitting prism group, and the material refractive index of the material is usually 1.5.

S730, forming a normal vector gradient field of each pixel point based on the azimuth angle and the zenith angle of the normal of each pixel point.

Specifically, based on the azimuth and zenith angles of the normal of the pixel point O, the normal of the pixel point O can be determined, and then based on the azimuth and zenith angles of the normal of each pixel point, the normal of the each pixel point O can be determined, so as to obtain the normal vector gradient field (p,q) of the to-be-measured object.

S740, integrating the normal vector gradient field of each pixel point to obtain depth information of each pixel point.

Specifically, after the normal vector gradient field (p,q) including the normal of each pixel point is calculated, the normal vector gradient field (p,q) is globally integrated according to the Frankot-Chellappa algorithm, the minimum value W of the difference between the surface ($Z_x$, $Z_y$) of the to-be-measured object and the normal vector gradient field (p,q) is determined, as specified in the following formula:

$$W = \int\int_{\Omega} \left[(Z_x - p)^2 + (Z_y - q)^2\right] dxdy \rightarrow \min \tag{4}$$

Then, the Fourier variation of the above Eq. 4 is performed to solve for the surface Z(x,y) of the to-be-measured object, and the following Eq. 5 can be obtained:

$$Z_{\mathcal{F}}(u, v) = \frac{-j}{2\pi}\left[\frac{uP_{\mathcal{F}}(u, v) + vQ_{\mathcal{F}}(u, v)}{u^2 + v^2}\right] \tag{5}$$

where $Z_{\mathcal{F}}$ (u,v) is the Fourier transform expression of Z(x,y), $P_{\mathcal{F}}$ (u,v) is the Fourier transform expression of x-direction gradient p(x,y), $Q_{\mathcal{F}}$ (u,v) is the gradient Fourier transform expression of y-direction gradient p(x,y). Then the depth information of the surface Z(x,y) of the to-be-measured object can be obtained by an inverse Fourier operation, and the specific calculation formula is as follows Eq. 6:

$$Z(x, y) = \mathcal{F}^{-1}\left\{\frac{-j}{2\pi}\left[\frac{uP_{\mathcal{F}}(u, v) + vQ_{\mathcal{F}}(u, v)}{u^2 + v^2}\right]\right\} \tag{6}$$

S750, generating a three-dimensional image of the to-be-measured object based on the depth information of each pixel point.

Specifically, according to the depth information of each pixel point, the specific position of each pixel point in the three-dimensional coordinate system can be determined, so that the three-dimensional image of the to-be-measured object can be generated.

In one embodiment of the present application, after analyzing the pictures of different polarization angles to determine the azimuth angle and the zenith angle of the normal of each pixel point in the pictures, the method provided by the present application includes: constructing an initial surface curve of the to-be-measured object based on a parallax error formed by the lens group in the three-dimensional imaging device; verifying the azimuth angle corresponding to the pixel point based on a result of multiplying a curvature of the initial surface curve and the normal of each pixel point; and the forming the normal vector gradient field of each pixel point based on the azimuth angle and the zenith angle of the normal of each pixel point includes: forming the normal vector gradient field of each pixel point based on the azimuth angle and the zenith angle of the normal of each pixel point when a corresponding azimuth of each pixel point is verified to be correct.

Specifically, based on the parallax error formed by the lens group, i.e., a binocular visual parallax error, a distance between the pixel point and the lens group can be determined, and thus initial depth information of the pixel point can be obtained. Thus based on the distance between the plurality of pixel points and the lens group, an initial surface curve of the to-be-measured object can be constructed. The initial surface curve can be regarded as curve passing through one or more pixel points, so that a curvature k of each initial surface curve is calculated; then a vector $\vec{n}$ of one of the pixel points on the initial surface curve is obtained, and the curvature k of each initial surface curve is multiplied by the vector $\vec{n}$ of the pixel point in the initial surface curve, and based on the multiplicative result, it can be determined whether the vector $\vec{n}$ is correct, and thus it can be verified whether the azimuth angle corresponding to the vector $\vec{n}$ of the pixel point is correct, and the verification operation is performed for each initial surface curve to obtain the correct azimuth angle of each pixel point.

In one embodiment of the present application, the verifying the azimuth angle corresponding to the pixel point based on the result of multiplying the curvature of the initial surface curve and the normal of the pixel point includes: when the curvature of the initial surface curve is greater than 0, if a multiplicative result is greater than 0, the azimuth angle corresponding to the pixel point is correct, and if the multiplicative result is less than 0, then the azimuth angle corresponding to the pixel point is incorrect; and when the curvature of the initial surface curve is less than 0, if the multiplicative result is greater than 0, the azimuth angle corresponding to the pixel point is correct, if the multiplicative result is less than 0, the azimuth angle corresponding to the pixel point is incorrect.

Specifically, a positive or negative curvature of the initial surface curve indicates a concave or convex condition of the initial surface curve. When the curvature of the initial surface curve is greater than 0, it means that the constructed initial surface curve is a convex curve. When the multiplicative result of the initial surface curve and the normal of the pixel point is greater than 0, it means that the direction of the normal of the pixel point is the same as the direction of the convexity of the initial surface curve, and the azimuth angle corresponding to the pixel point is correct. If the multiplicative result of the initial surface curve and the normal of the pixel point is less than 0, it means that the direction of the normal of the pixel point is not the same as that of the initial surface curve. If the multiplicative result of the initial surface curve and the normal of the pixel point is less than 0, it means that the direction of the normal of the pixel point is not consistent with the initial surface curve, and the azimuth angle corresponding to the pixel point is incorrect. Similarly, if the curvature of the constructed initial surface curve is less than 0, it means that the constructed initial surface curve is concave curve, then if the multiplicative result of the initial surface curve and the normal of the pixel point is greater than 0. That is, the direction of the normal of the pixel point is also concave, and the direction of the normal of the pixel point is the same as the direction of the convexity of the initial surface curve, then it means that the azimuth angle corresponding to the pixel point is correct. If the multiplicative result of the initial surface curve and the normal of the pixel point normal is less than 0, it means that the direction of the normal of the pixel point is not concave, the direction of the normal of the pixel point is inconsistent with the direction of the convexity of the initial surface curve, and the azimuth angle corresponding to the pixel point is incorrect. By the verification step of this embodiment, the correct azimuth angle can be determined from the two solutions of the azimuth angle.

In another embodiment, the azimuth angle of the pixel point includes a first azimuth angle and a second azimuth angle; the zenith angle of the pixel point includes a first zenith angle and a second zenith angle; after verifying that the azimuth angle is incorrect, the method provided by the present application further includes determining whether the azimuth angle that is verified to be incorrect is a first azimuth angle; and when the azimuth angle that is verified to be incorrect is the first azimuth angle, determining a second zenith angle corresponding to the pixel point based on the second azimuth angle.

Specifically, since the solution of the azimuth angle includes a solution of a diffuse reflection dominant and a solution of the mirror reflection dominant, if one of the solutions is verified to be incorrect, then the other solution is the correct azimuth angle. For example, when the solution $\varphi_d$ of the diffuse reflection dominant is verified to be incorrect, then the solution $\varphi_s$ of the mirror reflection dominant is the correct azimuth angle. Based on the azimuth angle $\varphi_s$, the correct second zenith angle $\rho_s$ is calculated, so that the correct normal n to the pixel point can be determined based on the second azimuth angle $\varphi_s$ and the second zenith angle $\rho_s$.

Figure 10:
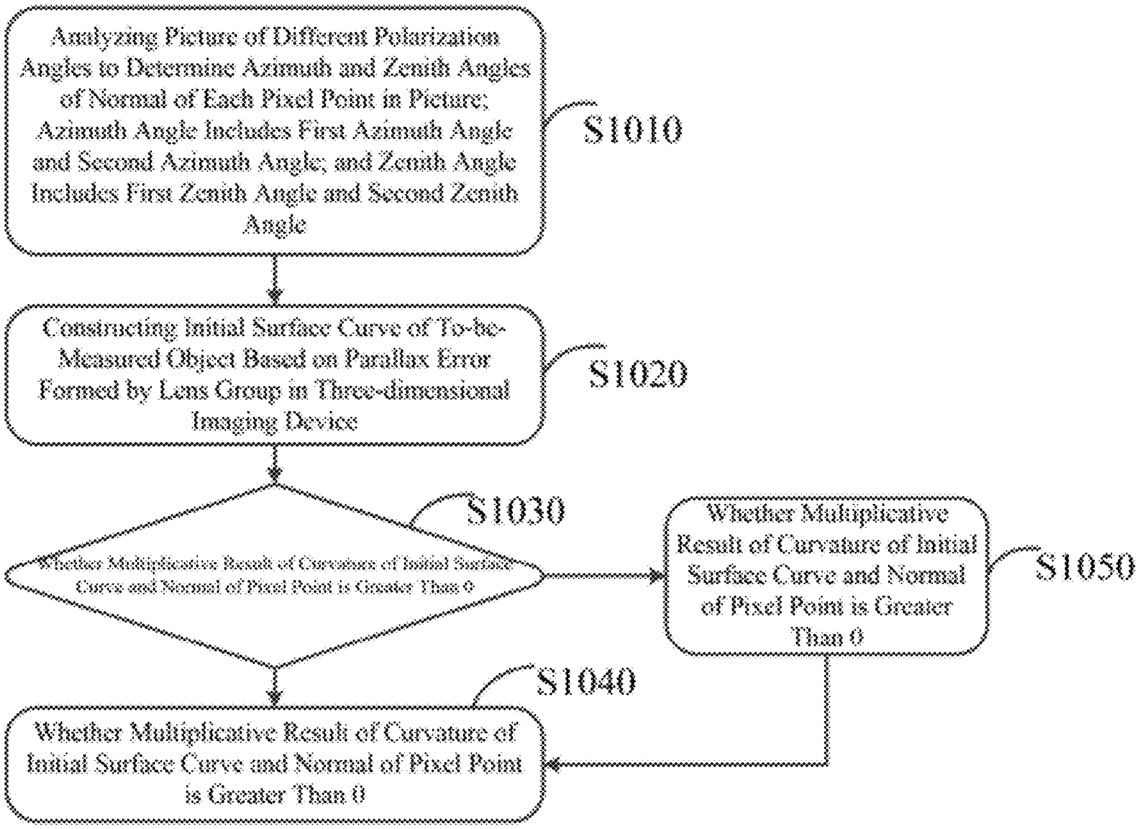
FIG. 10 is a flowchart of a three-dimensional imaging method according to an embodiment of the present application.

FIG. 10 is a flowchart of an embodiment of the present application, the embodiment includes S1010 to S1050, which is used to determine the correct azimuth and zenith angles of the pixel point, and thus determine the correct normal of the pixel point, specifically including:

S1010, analyzing pictures of different polarization angles to determine the azimuth and zenith angles of the normal of each pixel point in the pictures; the azimuth angle includes a first azimuth angle and a second azimuth angle; and the zenith angle includes a first zenith angle and a second zenith angle.

Specifically, as previously described, there are two solutions of the azimuth angle, the first azimuth angle may be the solution corresponding to the diffuse reflection dominant, then the first zenith angle is the zenith angle corresponding to the azimuth angle of the diffuse reflection dominant; the second azimuth angle may be the solution of the mirror reflection dominant, then the second zenith angle is the zenith angle corresponding to the azimuth angle of the mirror reflection dominant.

S1020, constructing an initial surface curve of the to-be-measured object based on the parallax error formed by the lens group in the three-dimensional imaging device.

Specifically, as previously described, the depth information of the pixel points can be roughly determined according to the parallax error formed by the lens group in the three-dimensional imaging device, thereby constructing the initial surface curve.

S1030, whether a multiplicative result of a curvature of the initial surface curve and a normal of the pixel point is greater than 0.

Specifically, according to the judgement result of S1030, a corresponding step is executed. If the judgement result is yes, S1040 is executed; if the judgement result is no, S1050 is executed and then S1040 is executed.

S1040, forming a normal vector gradient field of each pixel point based on the azimuth and zenith angles of the normal of each pixel point.

Specifically, based on the azimuth and zenith angles of the normal of each pixel point, the normal of the pixel point can be determined, then after determining the normals of all pixel points, the normals of these pixel points form a normal vector gradient field.

S1050, when the azimuth angle verified to be correct is a first azimuth angle, determining a second zenith angle corresponding to the pixel point based on the second azimuth angle.

Specifically, if the first azimuth angle is the solution corresponding to the diffuse reflection dominant and is verified to be incorrect, the second azimuth angle is substituted into Eq. 3 to obtain the second zenith angle corresponding to the second azimuth angle.

Figure 11:
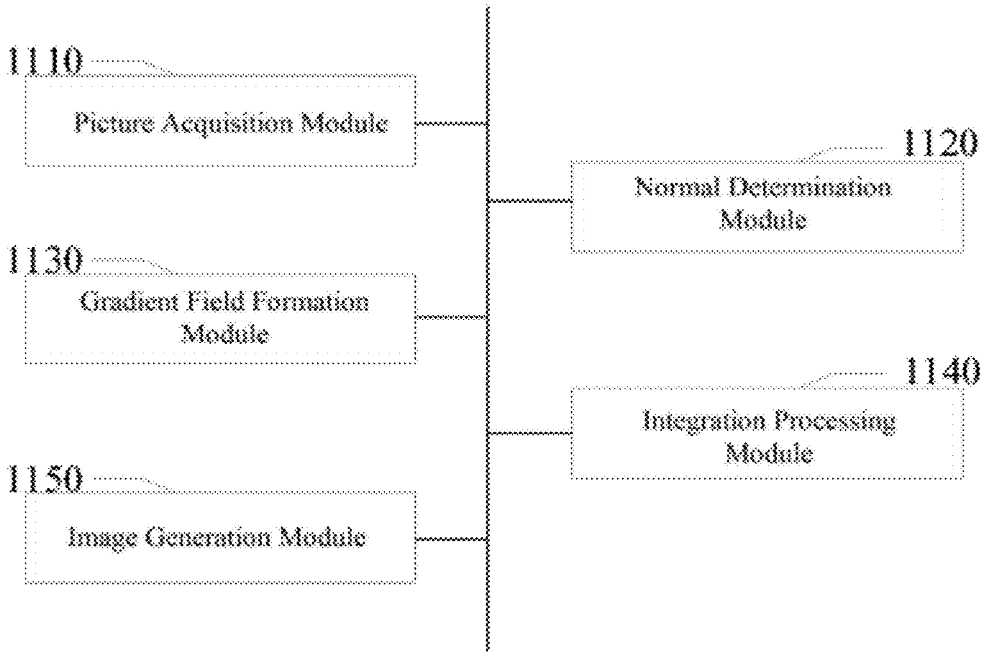
FIG. 11 is a structural block diagram of a three-dimensional imaging device according to an embodiment of the present application.

The following describes an embodiment of a device of the present application for realizing a three-dimensional imaging method, as shown in FIG. 11, the present application provides a three-dimensional imaging apparatus, which includes:

- a picture acquisition module 1110 configured for obtaining pictures formed by at least three polarization angles of a to-be-measured object, the pictures are generated by the three-dimensional imaging device in any one of the embodiments provided in the present application;
- a normal determination module 1120 configured for analyzing the pictures of different polarization angles to determine an azimuth angle and a zenith angle of a normal of each pixel point in the pictures, the azimuth angle is an angle between the normal of each pixel point and a horizontal direction, and the zenith angle is an angle between the normal of each pixel point and a vertical direction;
- a gradient field formation module 1130 configured for forming a normal vector gradient field of each pixel point based on the azimuth angle and the zenith angle of the normal of each pixel point;
- an integration processing module 1140 configured for integrating the normal vector gradient field of each pixel point to obtain depth information of each pixel point; and
- an image generation module 1150 configured for generating a three-dimensional image of the to-be-measured object based on the depth information of each pixel point.

In one embodiment of the present application, the device further includes a curve verification module configured for constructing an initial surface curve of the to-be-measured object based on a parallax error formed by the lens group in the three-dimensional imaging device before forming the normal vector gradient field of each pixel point based on the azimuth and zenith angles of the normal of each pixel point; verifying the initial surface curve based on a multiplicative result of the curvature of the initial surface curve and the normal of the pixel points; and the integrating the normal vector gradient field of each pixel point to obtain depth information of each pixel point includes integrating the normal vector gradient field of each pixel point to obtain depth information of each pixel point when the initial surface curve is verified to be correct.

In one embodiment of the present application, the curve verification module is configured to confirm azimuth ambiguity. When the curvature of the initial surface curve is greater than 0, it determines that the azimuth angle corresponding to the pixel point is correct if the multiplicative result of the initial surface curve and the normal of the pixel is greater than 0. Conversely, if the multiplicative result is less than 0, the azimuth angle corresponding to the pixel point is incorrect. On the other hand, when the curvature of the initial surface curve is less than 0, the curve verification module will determine that the azimuth angle corresponding to the pixel point is correct if the multiplicative result of the initial surface curve and the normal of the pixel is greater than 0. Conversely, if the multiplicative result is less than 0, the azimuth angle corresponding to the pixel point is incorrect.

It should be known that specific embodiments of the three-dimensional imaging device provided by the present application have been disclosed in the method embodiments and will not be explained herein.

Figure 12:
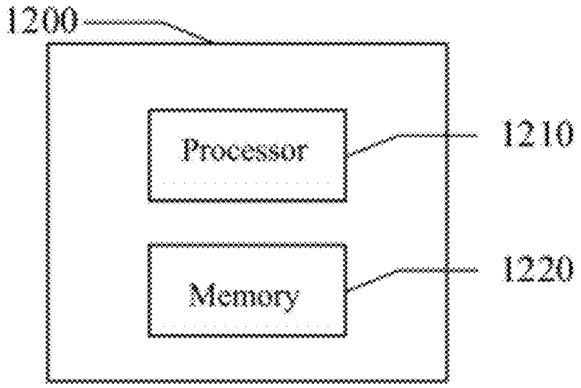
FIG. 12 is a structural block diagram of an electronic device according to an embodiment of the present application.

As shown in FIG. 12, the present application provides an electronic device 1200, which includes a processor 1210; a memory 1220 for storing executable instructions of the processor 1210; and the processor 1210 executes the executable instructions to cause the electronic device to implement the three-dimensional imaging method provided in any one embodiment of the present application.

Specifically, the three-dimensional imaging method provided in the present application is stored in the memory 1220 of the electronic device 1200, and after a picture of the to-be-measured object is obtained by the sensor group in the three-dimensional imaging device, the corresponding three-dimensional imaging method is executed, to construct and verify an initial surface curve of the to-be-measured object, and performing a global integration based on the gradient field of the normal vector of each pixel point, to restore the surface of the to-be-measured object.

It should be known that specific embodiments of the electronic device provided by the present application have been disclosed in the method embodiments and will not be explained herein.

Figure 13:
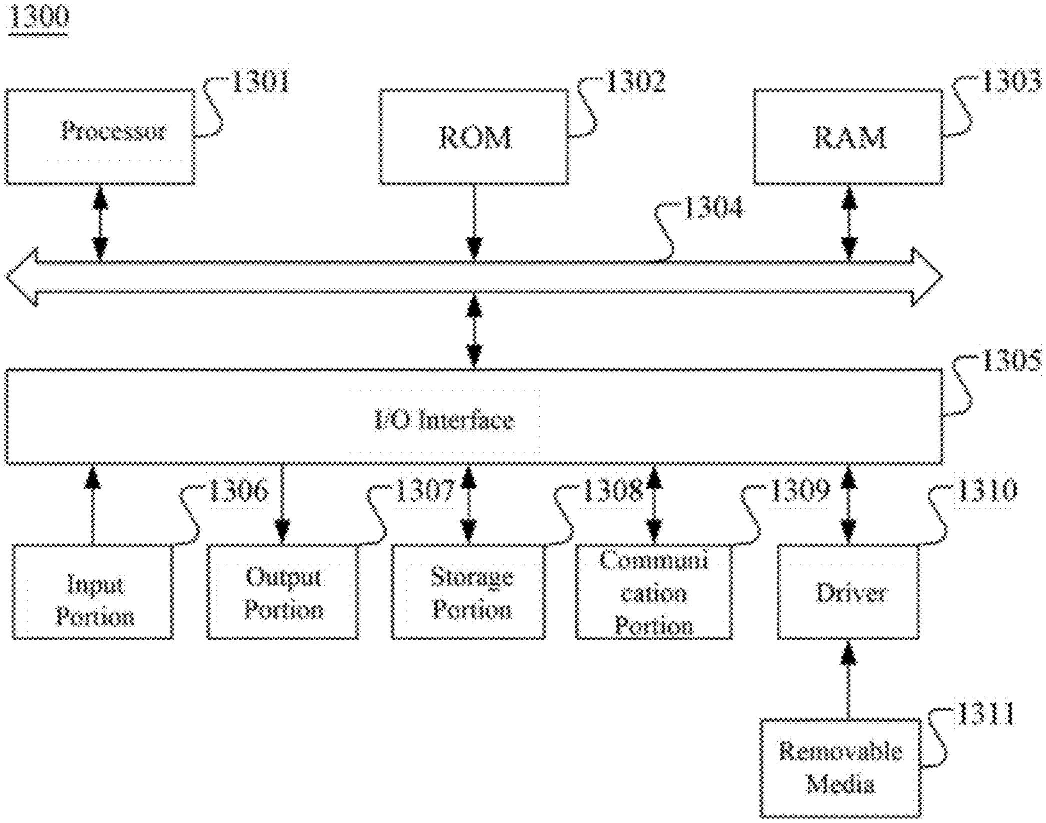
FIG. 13 is a structural block diagram of a computer system for implementing an electronic device according to an embodiment of the present application.

FIG. 13 is a block diagram of a computer system architecture for implementing an electronic device of an embodiment of the present application.

It is to be noted that the computer system 1300 of the electronic device illustrated in FIG. 13 is only an example and should not bring about any limitation on the functions and scope of use of the embodiments of the present application.

As shown in FIG. 13, the computer system 1300 includes a processor 1301, the processor 1301 may be a Central Processing Unit (CPU) or a Microcontroller Unit (MCU), and the processor 1301 may be operated in accordance with a program stored in a Read-Only Memory 1302 (ROM) or loaded into a Random Access Memory 1303 (RAM) from a storage portion 1308, the processor 1301 may perform a variety of appropriate actions and processes based on the program stored in a Read-Only Memory 1302 (ROM) or loaded from storage portion 1308 into a Random Access Memory (RAM). The Random Access Memory 1303 are also stored with various programs and data necessary for the operation of the system. The processor 1301, the Read Only Memory 1302, and the Random Access Memory 1303 are connected to each other via a bus 1304. An input/output interface 1305 (I/O interface) is also connected to bus 1304.

The following components are connected to the input/output interface 1305: an input portion 1306 including a keyboard, a mouse, etc.; an output portion 1307 including, for example, a Cathode Ray Tube (CRT), a Liquid Crystal Display (LCD), and speakers, etc.; and a storage portion 1308 including a hard disc, etc.; and a communication portion 1309 including a network interface card such as a LAN card, a modem, etc. The communication portion 1309 performs communication processing via a network such as the Internet. The driver 1310 is also connected to the input/output interface 1305 as needed. The removable media 1311, such as disks, optical discs, magnetic discs, semiconductor memories, etc., are mounted to the driver 1310 as needed so that computer programs read from it are mounted into the storage portion 1308 as needed.

In particular, according to embodiments of the present application, the processes depicted in the flowchart of each method may be implemented as computer software programs. For example, embodiments of the present application include a computer program product which includes a computer program carried on a computer readable medium, the computer program includes a program code for performing the method shown in the flowchart. In such embodiments, the computer program may be downloaded and installed from a network via communication portion 1309, and/or installed from a removable medium 1311. When the computer program is executed by the processor 1301, various functions defined in the system of the present application are performed.

It is noted that the computer-readable medium shown in embodiments of the present application may be a computer-readable signal medium or a computer-readable storage medium or any combination of the above. The computer-readable storage medium maybe, for example,—but is not limited to—a system, a device, or an apparatus, or device of electricity, magnetism, light, electromagnetism, infrared, or semiconductors, or any combination of the above. More specific examples of a computer-readable storage media may include, but are not limited to: an electrical connection having one or more wires, a portable computer disk, a hard drive, a random access memory (RAM), a read-only memory (ROM), an erasable programmable read only memory (EPROM), a flash memory, an optical fiber, a portable compact disk Read-Only Memory (CD-ROM), an optical storage device, a magnetic storage device, or any suitable combination of the foregoing. In the present application, a computer-readable storage medium may be any tangible medium containing or storing a program that may be used by or in combination with an instruction execution system, apparatus or device. And in the present application, the computer-readable signal medium may include a data signal propagated in baseband or as part of a carrier carrying computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a program for use by, or in combination with, an instruction-executing system, apparatus, or device. The program code contained on the computer-readable medium may be transmitted using any suitable medium, including, but not limited to: wireless, wired, etc., or any suitable combination of the foregoing.

The flowcharts and block diagrams in the accompanying drawings illustrate the architecture, functionality, and operation of systems, methods, and computer program products that may be implemented in accordance with various embodiments of the present application. At this point, each box in the flowcharts or block diagrams may represent a module, program segment, or portion of code, and the module, program segment, or portion of code contains one or more executable instructions for implementing the specified logical functions. It should also be noted that in some implementations as replacements, the functions indicated in the boxes may also occur in a different order than that indicated in the accompanying drawings. For example, two consecutively represented boxes can actually be executed substantially in parallel, and they can sometimes be executed in reverse order, depending on the function involved. It should also be noted that each box in a block diagram or flowchart, and combinations of boxes in a block diagram or flowchart, may be implemented with a dedicated hardware-based system that performs the specified function or operation, or may be implemented with a combination of dedicated hardware and computer instructions.

It should be noted that although a number of modules or units of the apparatus for action execution are mentioned in the detailed description above, this division is not mandatory. Indeed, according to embodiments of the present application, the features and functions of two or more modules or units described above may be specified in a single module or unit. Conversely, the features and functions of one module or unit described above may be further divided to be specified by more than one module or unit.

By the above description of the embodiments, it is readily understood by those skilled in the art that the embodiments described herein can be implemented by means of software or by means of software in combination with the necessary hardware. Thus, the technical solution according to the embodiments of the present application may be embodied in the form of a software product that may be stored in a non-volatile storage medium (which may be a CD-ROM, a USB flash drive, a removable hard drive, etc.) or on a network, and include a number of instructions to cause a computing device (which may be a personal computer, a server, a touch terminal, or a network device, etc.) to execute the software product according to the embodiments of the present application.

Other embodiments of this application will readily come to mind to those skilled in the art upon consideration of the specification and practice of the invention disclosed herein. The present application is intended to cover any variations, uses, or adaptations of the present application which follow the general principles of the present application and include means of common knowledge or those skilled in the art not disclosed herein.

It is to be understood that this application is not limited to the precise construction which has been described above and illustrated in the accompanying drawings, and that various modifications and changes may be made without departing from its scope. The scope of the present application is limited only by the appended claims.

What is claimed is:

1. A three-dimensional imaging device, comprising:

a lens group, gathering light beams to output a first light beam and a second light beam towards a first direction;

a beam-splitting prism group comprising a first beam-splitting prism and a second beam-splitting prism provided on a side of the lens group outputs the light beams, wherein the first beam-splitting prism transmits and reflects the first light beam to output a first transmitted light beam towards the first direction and a first reflected light beam towards a second direction; wherein the second beam-splitting prism transmits and reflects the second light beam to output a second transmitted light beam towards the first direction and a second reflected light beam towards the second direction; wherein the first direction and the second direction have a preset angle;

a polarizer group comprising at least three polarizers, wherein the at least three polarizers are provided on a side of the beam-splitting prism group outputs a light beam, wherein at least one of the polarizers is provided on a side of the beam-splitting prism group outputs a transmitted light beam, and at least one of the polarizers is provided on a side of the beam-splitting prism group outputs a reflected light beam; wherein the transmitted light beam comprises the first transmitted light beam and the second transmitted light beam, wherein the reflected light beam comprises the first reflected light beam and the second reflected light beam; wherein the polarizer group converts the transmitted light beam or the reflected light beam into a polarized light of a preset polarization angle; and a sensor group comprising at least three sensors, wherein a position of each sensor corresponds to a position of each polarizer, wherein each sensor obtains the polarized light of the preset polarization angle output from each polarizer to form an image.

2. The three-dimensional imaging device according to claim 1, wherein the lens group comprises a first lens and a second lens, wherein the polarizer group comprises a first polarizer, a second polarizer and a third polarizer, wherein the sensor group comprises a first sensor, a second sensor and a third sensor;

wherein in the first direction, centers of the first lens, the first beam-splitting prism, the first polarizer and the first sensor are located in a same axis, and centers of the second lens, the second beam-splitting prism, the second polarizer and the second sensor are located in a same axis; and wherein in the second direction, centers of the first beam-splitting prism, the third polarizer and the third sensor are located in a same axis, or centers of the second beam-splitting prism, the third polarizer and the third sensor are located in a same axis.

3. The three-dimensional imaging device according to claim 1, wherein the lens group comprises a first lens and a second lens, wherein the polarizer group comprises a first polarizer, a second polarizer and a third polarizer, wherein the sensor group comprises a first sensor, a second sensor and a third sensor;

wherein in the first direction, centers of the first lens, the first beam-splitting prism, the first polarizer and the first sensor are located in a same axis, or centers of the second lens, the second beam-splitting prism, the first polarizer and the first sensor are located in a same axis; and wherein in the second direction, centers of the first beam-splitting prism, the second polarizer and the second sensor are located in a same axis, and centers of the second beam-splitting prism, the third polarizer and the third sensor are located in a same axis.

4. The three-dimensional imaging device according to claim 1, wherein each beam-splitting prism comprises a beam-splitting surface, wherein the beam-splitting surface is at an angle not equal to 90° and 180° to each of the first light beam and the second light beam, and wherein the beam-splitting surface transmits a first preset proportion of light and reflects a second preset proportion of light in the first light beam, or for transmitting the first preset proportion of light and reflecting the second preset proportion of light in the second light beam.

5. The three-dimensional imaging device according to claim 4, wherein the beam-splitting surface is coated with a multi-layers dielectric film by evaporation coating, and the beam-splitting surface is transmissible and reflective of the first light beam and the second light beam.

6. The three-dimensional imaging device according to claim 4, wherein the beam-splitting surface is not perpendicular to and not parallel to the first light beam and the second light beam.

7. The three-dimensional imaging device according to claim 1, wherein beam paths formed by different beams have equal lengths, and wherein each beam path is from a position of entering any of lenses in the lens group to a position of a sensor corresponding to each lens in the sensor group.

8. The three-dimensional imaging device according to claim 1, wherein the polarizer group comprises four polarizers, wherein light intensities of polarized lights output from each of the four polarizers comprise a first polarized light intensity, a second polarized light intensity, a third polarized light intensity, and a fourth polarized light intensity;

wherein the first polarized light intensity is a light intensity of a first polarized light and the second polarized light intensity is a light intensity of a second polarized light in the first direction, respectively; and the third polarized light intensity is a light intensity of a third polarized light and the fourth polarized light intensity is a light intensity of a fourth polarized light in the second direction, respectively;

wherein an incident light intensity $S_0$ of the device is half of a total light intensity of the polarized lights of a plurality of preset polarization angles, and the total light intensity of the polarized lights is a sum of the first polarized light intensity, the second polarized light intensity, the third polarized light intensity and the fourth polarized light intensity; and wherein a light intensity difference $S_1$ of a first incident light in polarization directions in the device is a difference between the first polarized light intensity and the third polarized light intensity, wherein a light intensity difference $S_2$ of a second incident light in polarization directions in the device is a difference between the second polarized light intensity and the fourth polarized light intensity.

9. The three-dimensional imaging device according to claim 1, wherein an angle between the first transmitted light beam and the first reflected light beam is equal to the preset polarization angle, and an angle between the second transmitted light beam and the second reflected light beam is equal to the preset polarization angle.

* * * * *